(12) United States Patent
Schaer

(10) Patent No.: US 6,178,642 B1
(45) Date of Patent: *Jan. 30, 2001

(54) HEDGE CLIPPER

(75) Inventor: Alfred Schaer, Pieterlen (CH)

(73) Assignee: Scintilla AG, Solothurn (CH)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/113,477

(22) Filed: Jul. 10, 1998

(30) Foreign Application Priority Data

Jul. 11, 1997 (DE) .............................. 197 29 735
Jun. 18, 1998 (DE) .............................. 198 27 107

(51) Int. Cl.[7] ..................................... B26B 7/00
(52) U.S. Cl. ............... 30/216; 30/277.1; 30/276
(58) Field of Search ................ 30/216, 210, 382, 30/228, 276, 389, 381, 369, 388, 501, 502, 517, 312, 340, 347; 173/170

(56) References Cited

U.S. PATENT DOCUMENTS

| 4,683,660 | * | 8/1987 | Schurr | 30/382 |
| 4,757,881 | * | 7/1988 | Jonsson et al. | 30/382 |
| 5,150,523 | * | 9/1992 | McCurry | 30/382 |
| 5,233,750 | * | 8/1993 | Wolf et al. | 30/382 |
| 5,724,737 | * | 3/1998 | Stones | 30/216 |
| 5,867,910 | * | 2/1999 | Stegall et al. | 30/216 |

FOREIGN PATENT DOCUMENTS 0 214 455 A1   3/1987 (EP) .

* cited by examiner

Primary Examiner—M. Rachuba
Assistant Examiner—Omar Flores-Sánchez
(74) Attorney, Agent, or Firm—Michael J. Striker

(57) ABSTRACT

The motor-driven hedge clipper has a machine housing; a main handle provided with one switch button; a hollow U-shaped auxiliary handle and a single deadman switch operating mechanism for turning off the hedge clipper when not activated by an operator. The single deadman switch operating mechanism includes one and only one U-shaped button element movably mounted in the auxiliary handle and extending around the inner contour of the U-shaped auxiliary handle, so as to be movable radially outward and inward relative to the auxiliary handle in all directions; a mechanical biasing device for urging the button element radially outward, whereby the button element moves radially outward when not being pressed radially inward into the auxiliary handle; and a cable line arranged in the auxiliary handle and connected to the button element, so that it moves exclusively longitudinally when the button element is moved radially inward in any direction so that the deadman switch operating mechanism is activated and the hedge clipper is turned on.

9 Claims, 4 Drawing Sheets

HEDGE CLIPPER

BACKGROUND OF THE INVENTION

The present invention relates to hedge clippers.

Hedge clippers are usually provided with auxiliary handles which, for the safety of the operators are set into operation and can be held when both an on-switch on the main handle and also an additional switch activating button in the auxiliary handle remain pressed. When a switch actuation is released, the machine stops immediately. Therefore, it is not possible to operate the hedge clipper with only one hand which can lead to certain risks.

The European patent document EP-A-0 214 455 discloses a hedge clipper in which a C-shaped auxiliary handle is provided and has both legs as well as a web each supporting a control button. Thereby the buttons in all gripping positions of the hand which holds the auxiliary handle can be pressed simply and with good access. Each control button operates independently from the other buttons and acts on a single cable line which is prestressed and arranged in the interior of the hollow auxiliary handle. It can be deviated transversely to its longitudinal axis and because of the transverse deviation its ends tend to displace longitudinally. Since one of the ends of the cable line is fixedly connected in the interior of the auxiliary handle while the other end is arranged displaceably on an actuating element of the deadman switch, therefore during the transfer deviation of the cable line, regardless from which control button, the moveable cable line ends together with the actuating element are displaced and the deadman switch closes the operational current circuit for operation of the hedge clipper.

The known hedge clippers are composed of a plurality of different components, since the cable line is guided in the interior of the C-shaped auxiliary handle over its total length of the C-shape and over three control buttons supported on each C-leg independently from one another. As a result, the known hedge clippers have a relatively complicated construction and are relatively expensive.

SUMMARY OF THE INVENTION

Accordingly, it is an object of the present invention to provide a hedge clipper which avoids the disadvantages of the prior art.

In keeping with these objects and with others which will become apparent hereinafter, one feature of present invention resides, briefly stated, in a hedge clipper in which the auxiliary handle has only one button element which is arranged relative to the auxiliary handle so that it is moveable radially outwardly in all directions, and the cable line is driven with it relative to the switch, wherein the cable line is coupled with the button element so as to be exclusively longitudinally deviatable.

When the hedge clipper is designed in accordance with the present invention, it has a small number of parts and a simple construction of the auxiliary handle and therefore can be produced simply in a cost-favorable manner, and also the switch actuation of the deadman switch is especially robust.

Moreover, the actuating force on the auxiliary handle for switch actuation is especially low in any gripping position, and the control button can be handled in each actuation direction so that it is easy accessible and convenient.

Since only one button element is supported on the auxiliary handle in each leg moveably, the auxiliary handle can be produced with great tolerances and low number of components.

The cable line is very short, and shorter than the length of the legs. Therefore, it can be arranged in the handle especially easy and mounted very simply.

The cable line, despite the transfer displacement, remains longitudinally actuatable. Therefore, it is subjected to smaller loads and lower material fatigue.

The cable line is arranged between the supporting points of the button element and guided over a stationary projection of the auxiliary handle between the supporting points. Thereby a transverse displacement of the cable line during the longitudinal actuation is possible in two directions.

The cable line is provided with loops at both ends. Thereby it is especially easy to mount it between the switch actuator and the button element.

A part of the button element which is opposite to the part carrying the end of the cable line forms a guiding incline, in particular a guiding curve for the cable line. Therefore the cable line is guided reliably by abutting against a large surface and also is supported in wear-free manner.

The cable line can be formed in a sine shape. In this construction it is especially easy to be tensioned, so that during the actuation of the button element a very direct response of the switch is obtained.

The cable line is rotatably supported on a suspension pin between the guiding incline of the button element and the mounting, and also is guided on a cam disc which supports the plunger. Therefore during loading of the cable line along its axis, its wear is especially low.

The button element is held in the tensioned position by a spring in the interior of the auxiliary handle. Therefore its operability and position-safety is guaranteed.

The button element is provided substantially at an end of its leg with a transverse web connected to it. Therefore it is especially form-stable and deformation-secure, so that during actuation it guarantees a very direct response of the switch.

The button element is provided with recesses at least on each end of the leg, with stationary cams of the auxiliary handle engaging in the recesses. Therefore the actuation path of the button element over a predetermined actuation stroke in all operational direction is determined or limited, and the button element is secured from falling out from the auxiliary handle.

The button element can be formed as a hollow body provided with many interior ribs. With this construction, it is especially light, bending-resistant and operation-friendly.

The button element can be provided with a centered support in the region of its centering dome located centrally on the upper leg, relative to the auxiliary handle over an elastic loop. In this construction, a very simple restoring mechanism is provided for the button element, so that the button element after the actuation is always returned to its initial position.

The elastic loop which operates as a string is pretensioned through a projecting finger of the button element, and a counter finger spaced from it and located opposite to it on the auxiliary handle is held. Therefore, this construction is especially mounting-friendly.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
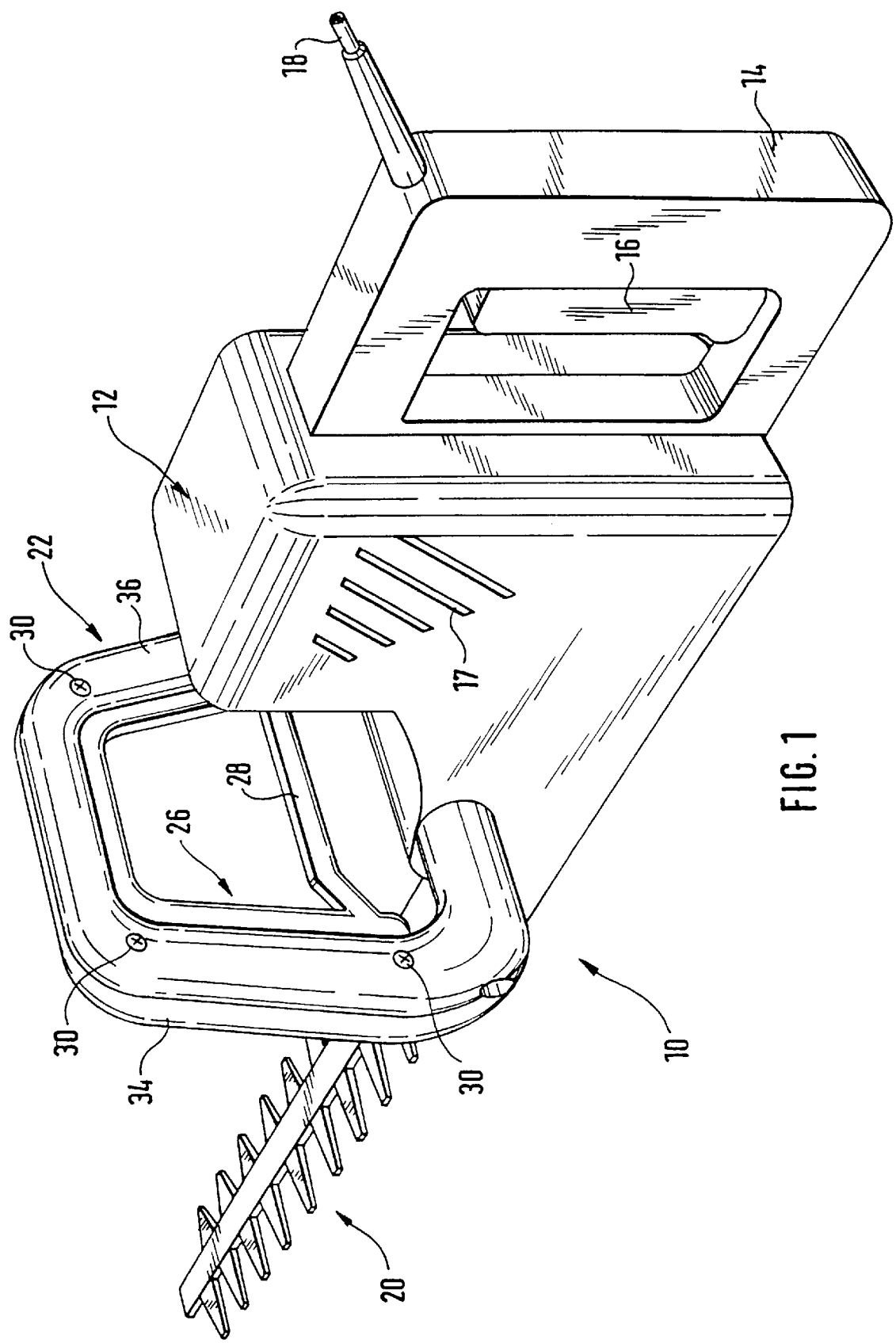
FIG. 1 is a view showing a hedge clipper with an auxiliary handle in accordance with the present invention.

A hedge clipper 10 which is shown in FIG. 1 has a central machine housing 12. The housing accommodates a not shown electric motor as well as a drive for a hedge clipper cutting unit 20 or a hedge clipper cutter.

When considered at the right in the observation direction, a handle 14 is arranged at the rear end of the machine housing 12 and identified as a spade handle. It has a switching button 16 for actuation of an on-off switch. The machine housing 12 is provided laterally with a ventilation slot 17, and an electric cable 18 extends from it through the rear end of the handle 14. The hedge clipper cutting unit 20 is located at the front side on the machine housing 12 and provided with not shown reciprocating hedge clipper cutters and cutter holders.

The machine housing 20 carries a forwardly inclined auxiliary handle 22. The auxiliary handle 22 is hollow and composed of two half-shells 34, 36 which are connected with one another by screws 30. A button element 26 is located within an inner contour of the auxiliary handle 22. It is formed so as to substantially follow the U-shaped contour of the auxiliary handle 22. It is connected by a transverse web 28 in the region of its leg ends. Due to the arrangement of the transverse web 28 the button element 26 is substantially reinforced, and the not shown switch can be actuated in the interior of the machine housing 12 without a gap.

In order to work with the hedge clipper 10 in accordance with the present invention, an operator grasps the rear handle 14 with its main hand and the auxiliary handle 22 with its guiding hand. When the main hand now actuates the button 16 and simultaneously the guiding hand actuates the button element 26, the power supply circuit of the not shown motor is closed, the motor is set in operation, and the hedge clipper is driven in a reciprocating fashion.

Figure 2:
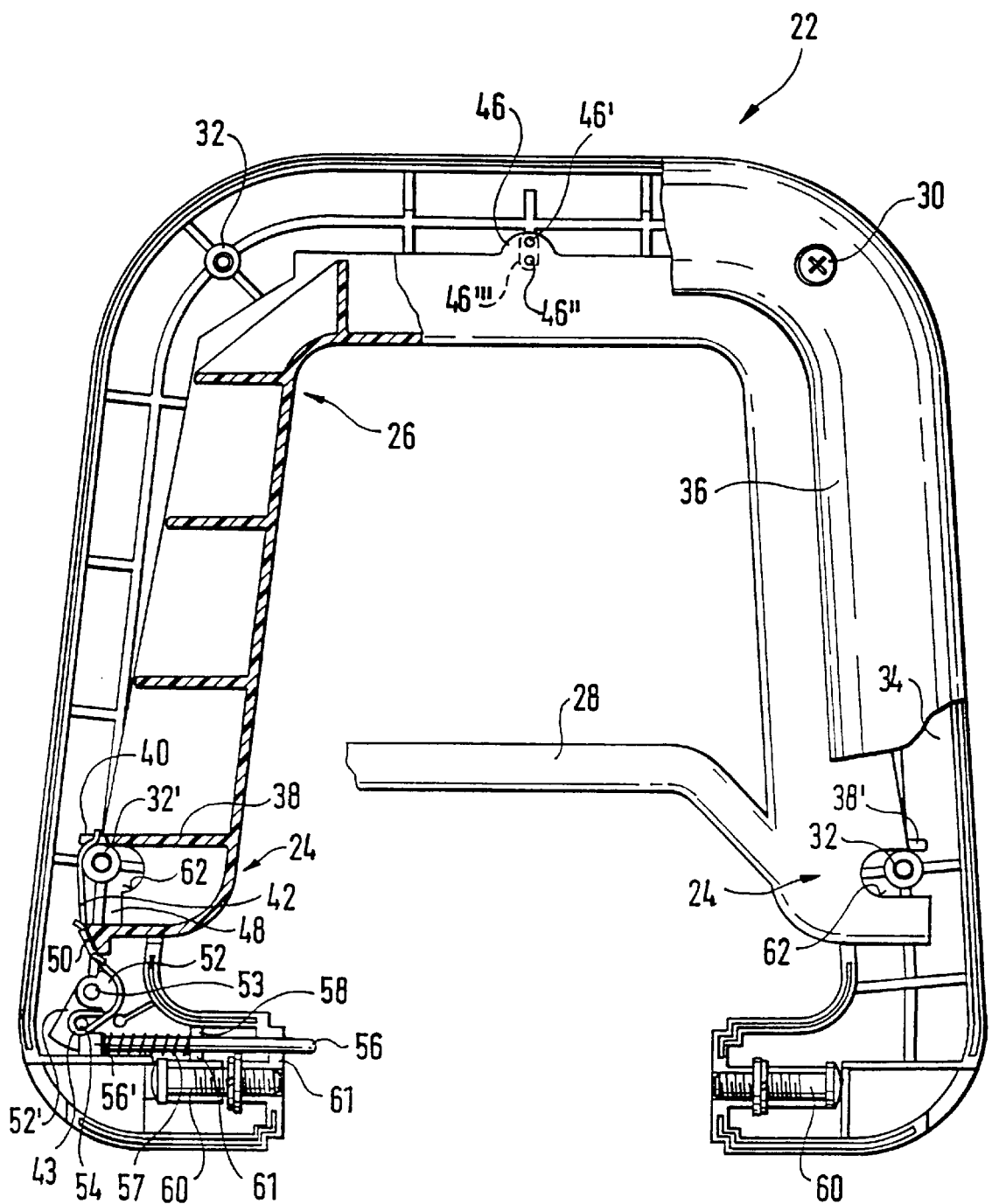
FIG. 2 is a view showing a longitudinal cross-section of the auxiliary handle.
Figure 3:
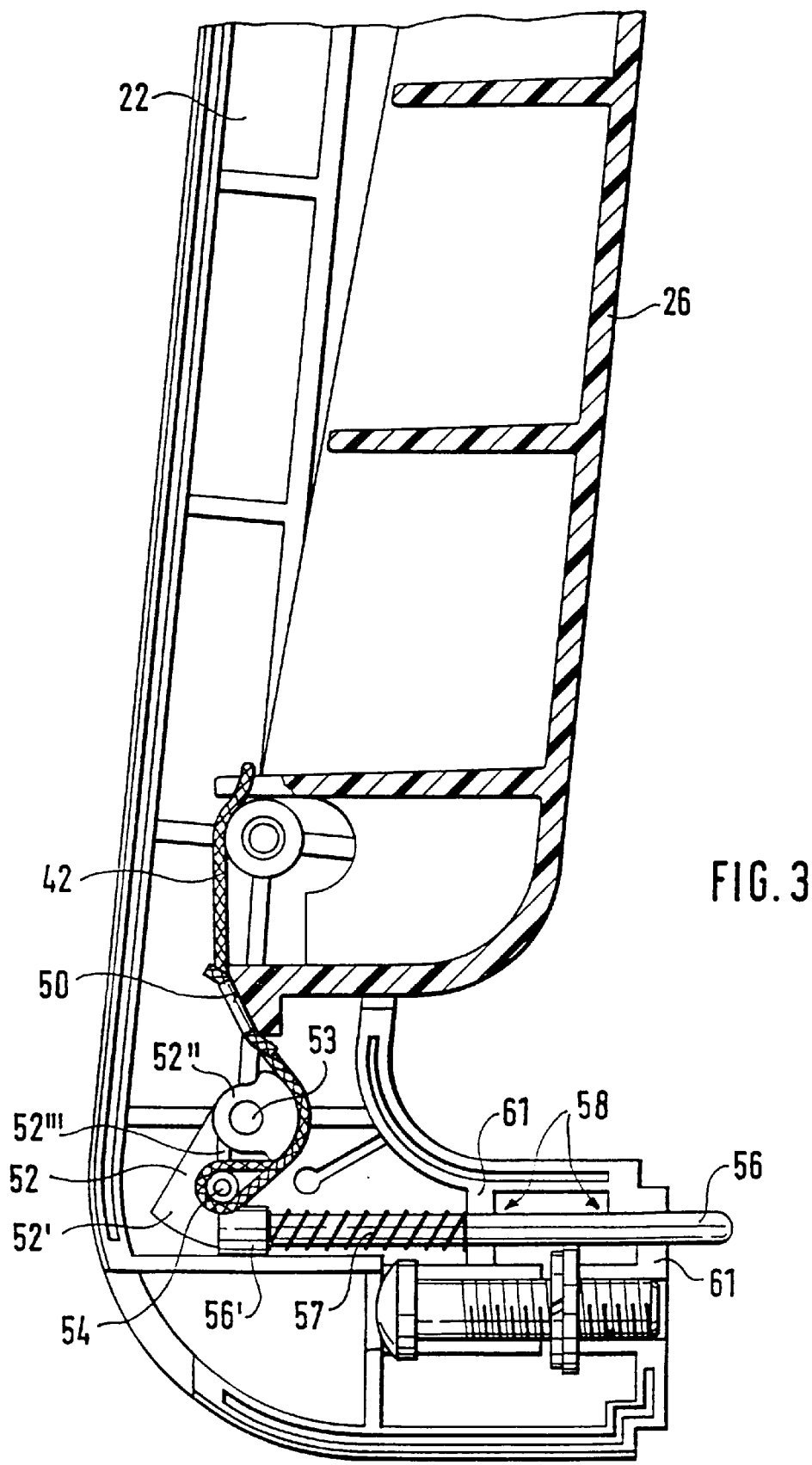
FIG. 3 is a view showing an enlarged fragment of FIG. 2.

The auxiliary handle 22 which is C-shaped and shown in FIGS. 2 and 3 in a partially broken manner, has an A-shaped button element 26, and a lower and upper shell-shaped housing parts 34, 36. Their inner periphery has a not shown slot which is dimensioned so that the button element 26 can displaceably pass through it into the interior of the auxiliary handle 22. The auxiliary handle 22 has four screw domes 32, 32', with a screw 30 fixed in each of them. Therefore the lower and the upper housing halves 34, 36 of the auxiliary handle 22 are assembled to form a unit.

The button element 26 is formed as a hollow body which is provided with a plurality of inner ribs. It is supported in the region of a mammilated centering dome 46 over an elastic loop 46''' relative to the auxiliary handle 22 so as to be centered. For this purpose the elastic loop 46''' which operates as a spring is held in a pre-stressed position by a projecting finger 46' of the button element 26 as well as a spaced counter finger 46'' of the lower shell 34 of the auxiliary handle 22, located opposite to the first mentioned finger 46'. The loop 46''' returns the button element 26 back to its initial position after the actuation.

The button element 26 carries a non releasable wound loop cable line 42 on its lower leg region when considered at the left side in the observation direction. It is located on a projecting rib 38 whose end is formed as a finger 40. The cable link 42 leads to the left and is curved over a screw dome 32, on which it is supported so as to be downwardly pulled in a neutral switching position of the button element 26 and loaded with a spring 57.

The other leg of the button element 26 carries a second rib 38' which is mirror-symmetrical relative to the leg which carries the rib 38. It is downwardly supported on a further screw dome 32, similarly to the rib 38.

The cable line 42 bridges a recesses 48 laterally outwardly in a lower region of the leg of the button element 26 and lies on a guiding incline 50 of the button element 26. In its further course, the cable line 42 leads to the right in a curved position around a cam disc 52, and from it further to a pin-shaped projection 54 which is connected with the cam disc 52 and non-releasably and fixedly engages with a loop-shaped end 43.

The cam disc 52 is rotatably supported with an opening 53' around a housing-fixed axle 53 and reduces the friction between the cable line 42 and the auxiliary handle during actuation of the cable line 42. The reason is that the cable line 42 can roll over the curved surface of the cam disc, and the rolling friction without sliding friction is produced between the cable line 42 and the cam disc 52.

The pin-shaped projection 54 is mounted on the cam disc 52 at a radial distance from its center on the turning lever 52'. The cam disc 52 engages with one end its turning lever 52' in a forked-shape rear end of a plunger 56 which is guided in the grooves of ribs 61 of the auxiliary handle 22. It acts during actuation of the button element 26, together with the projection 54 and the turning lever 52' to the right in the observation direction or in other words into the interior of the machine housing 12. There it actuates a not shown switch D (shown in FIGS. 4 and 5) which operates as a deadman switch.

A reinforcing rib 52''' extends between the projection 54 and the collar 52'' extending around the opening 53'. The reinforcing rib 52''' holds the pin-shaped projection 54 over a part of its length in a non-deformable manner on the cam disc 52.

The plunger 56 is supported in the longitudinal guide 58 in a friction-free and longitudinally displaceable manner in the lower region of the left leg 24 of the auxiliary handle 2. It is engaged by spring 57 which urges the plunger 56 to the left as considered in the observation direction. For this purpose it is supported between a collar-shaped and fork-shaped cylinder head 56' of the plunger 56 and two housing-fixed transverse ribs 61. The movement in direction of the plunger 56 extends perpendicular to the longitudinal extension of the cable line 42.

Because of the pre-tensioning force of the spring 57, the plunger 56 together with the cam disc 52, the cable line 42 and the button element 26 is returned to a neutral switching position after each actuation. In particular, the deadman switch D interrupts the operational circuit.

Mounting screws 60 extend through both leg ends 24 of the auxiliary handle 22. They fix the auxiliary handle 22 on the machine housing 12 of the hedge clipper 10 in a flanged manner. Both the lower and the upper housing halves 34, 36 of the auxiliary handle 22 as well as the button element 26 carry a plurality of reinforcing ribs for improving their shape rigidity.

The button element 26 is supported turnably about a screw dome 32 operating as a rotary point, and at the same time longitudinally displacably. The button element 26 is supported freely displacably within certain limits relative to the screw dome 32' operating as an abutment, in the central plane of the button element 26. For providing the required movement freedom of the button element 26 relative to the auxiliary handle 22, the elongated hole-shaped or key-hole-shaped recesses 62 are provided in the lower leg region of the button element 26. They engage the screw dome 32, 32' or at least abut on them in a neutral position of the button element 26.

Figure 4:
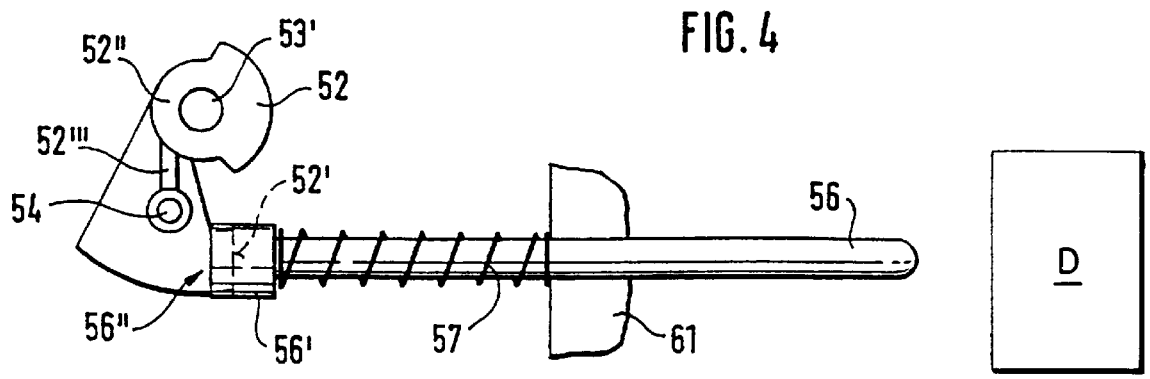
FIG. 4 is a view showing a movement transmitting element between a cable line and a deadman switch when a button element is not actuated.
Figure 5:
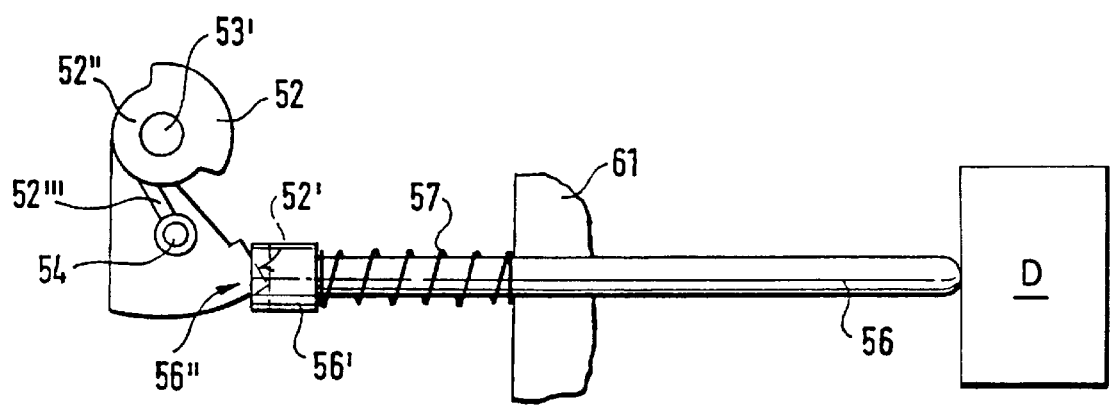
FIG. 5 is a view showing a movement transmitting element of FIG. 4 when the button element is actuated.
Figure 6:
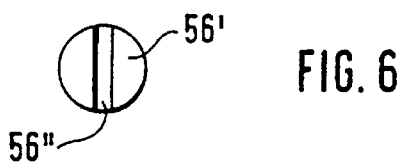
FIG. 6 is a view showing an end side of a cylinder-slot body of a plunger.

FIGS. 4 and 5 show the cam disc 52 and the plunger 56 individually on an explosion view, to illustrate the parts and operational elements of FIGS. 2 and 3. FIG. 4 shows the neutral position of the cam disc 52 and the plunger 56 with the not-actuated button element 26, while FIG. 5 shows the deviated position of the cam disc with the actuated button element 26.

The actuation of the deadman switch by the button element 26 of the auxiliary handle 22 is performed in the following manner:

When the button element 26 is displaced upwardly as considered in the observation direction, the spring 57 is compressed and the cable line 42 is pulled along its longitudinal axis so as to slide over the curvature of the dome 32'. The cable line 42 pulls the projection 54 in the counter clockwise direction around the axle 53 of the cam disc 54 together with it. The turning lever 52' (FIGS. 4, 5) turns the plunger 56 to the right.

Since the turning lever 52' is slidingly supported in the end-side slot 56" of the forked-shape end of the cylinder head 56' of the plunger 56, the plunger 56 must follow the movement of the turning lever 52'. The material for the turning lever 52' and the cylinder head 56' is selected so that their movement transmitting regions during interengagement and sliding produce only minimal friction with resulting minimal wear. Therefore the cam disc 52 and the plunger 56 form an especially simple, robust and easily accessible force transmitting device.

When the button element 26 after engaging of the right leg 24 of the auxiliary handle 22 as considered in the observation direction is displaced to the right by the operator's hand, the cable line 42 is pulled slidingly to the right around or over the dome 32. This leads to a longitudinal actuation of the cable line 42. Therefore, similarly to the above described deviation, the projection 52 is moved by the button element 26 around the axle 53, and the plunger 56 is moved again to the right.

When the left leg of the button element 26 as considered in the observation direction is displaced to the left, the cable line 42 is moved by the finger 40 in connection with the guiding incline 50 away from the screw dome 32. Because of this movement, the cable line 42 rolls in the longitudinal direction around the curved rolling surface of the cam disc 52 and pulls it on the pin-shaped projection 54 around the axle 53 in a counterclockwise direction. Thereby the plunger 56 is driven again to the right linearly.

In all cases of the actuation, the recesses 62 operate in the region of the fibs 38 or the fingers 40, for limiting of the actuation stroke of the button element 26, which can move thereby over a very short fixed actuation path of the plunger 56 for releasing the deadman switch. Moreover, the elastic loop 46''' which is formed for example as a rubber ring is returned back to its central initial position after releasing of the button element 26 and supports a fine controllability of the deadman switch.

It will be understood that each of the elements described above, or two or more together, may also find a useful application in other types of constructions differing from the types described above.

While the invention has been illustrated and described as embodied in hedge clippers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motor-driven hedge clipper comprising a machine housing (12); a main handle (14) provided with an on-off switch comprising a switching button (16), said main handle (14) being supported on said machine housing (12); a hollow auxiliary handle (22) supported on said machine housing and having a U-shaped inner contour; and a single deadman switch operating mechanism for operating a deadman switch (D) to keep the hedge clipper turned on when the on-off switch is turned on and the deadman switch operating mechanism is activated by an operator of the hedge clipper, said single deadman switch operating mechanism comprising one and only one button element (26) located within said auxiliary handle (22) and formed to extend around and along the U-shaped inner contour of the auxiliary handle, said button element (26) being supported in said auxiliary handle so as to be movable radially relative to said auxiliary handle in all directions by a hand of an operator;

spring means (46, 46', 46",46''') for urging said button element (26) outward into an initial position when said button element (26) is released by the hand of the operator;

a plunger (56) biased by a spring element (57) so as to be urged from an operating position in which the plunger (56) activates the deadman switch (D), so that the hedge clipper is turned on when the on-off switch is turned on, and into a neutral position in which the plunger (56) deactivates the deadman switch (D), so that the hedge clipper is turned off even when the on-off switch is turned on;

a pivotally mounted cam disk (52) with a turning lever (52') engaged with one end of said plunger (56); and a cable line (42) arranged within said auxiliary handle and connected at one end to said button element and at another end thereof to said cam disk (52) so that said cable line (42) rotates said cam disk (52) via said turning lever (52') and moves said plunger (56) in a direction against said spring element (57) when said button element (26) is moved in a direction against said spring means (46,46',46",46'''), whereby said deadman switch is activated.

2. The motor-driven hedge clipper as defined in claim 1, wherein said cam disk (52) is arranged next to one end of said button element (26) and said cable line (42) is connected to said button element (26) near said one end of said button element.

3. The motor-driven hedge clipper as defined in claim 1, wherein said auxiliary handle (22) has a screw dome (32), said button element (26) is rotatable about a rotary point at said screw dome (32), said screw dome (32) acts as an abutment for said button element (26) and said button element (26) is simultaneously supported so as to be linearly displaceable relative to said rotary point.

4. The motor-driven hedge clipper as defined in claim 1, wherein said auxiliary handle (22) has an additional screw dome (32'), said button element (26) is freely movable within predetermined limits in a central plane thereof relative to an additional rotary point provided at said additional screw dome (32') and said additional screw dome (32') acts as an additional abutment for said button element (26).

5. A motor-driven hedge clipper comprising a machine housing (12); a main handle (14) provided with an on-off switch comprising a switching button (16), said main handle (14) being supported on said machine housing (12); a hollow auxiliary handle (22) supported on said machine housing and having a U-shaped contour; and a single deadman switch operating mechanism for operating a deadman switch (D) to keep the hedge clipper turned on when the on-off switch is turned on and the deadman switch operating mechanism is activated by an operator of the hedge clipper, said single deadman switch operating mechanism comprising one and only one button element (26) located within said auxiliary handle (22) and formed to extend around and along the U-shaped inner contour of the auxiliary handle, said button element (26) being supported in said auxiliary handle so as to be movable radially relative to said auxiliary handle in all directions by a hand of an operator;

spring means (46, 46', 46",46''') for urging said button element (26) outward into an initial position when said button element (26) is released by the hand of the operator;

a plunger (56) biased by a spring element (57) so as to be urged from an operating position in which the plunger (56) activates the deadman switch (D), so that the hedge clipper is turned on when the on-off switch is turned on, and into a neutral position in which the plunger (56) deactivates the deadman switch (D), so that the hedge clipper is turned off even when the on-off switch is turned on;

a cam disk (52); and a cable line (42) arranged within said auxiliary handle and coupled between said button element and said plunger (56) so that said plunger (56) is moveable in a direction against said spring element (57) when said button element (26) is moved in a direction against said spring means (46,46',46",46'''), whereby said deadman switch (D) is activated.

6. The motor-driven hedge clipper as defined in claim 5, wherein said cam disk (52) is pivotally mounted and has a turning lever (52') engaged with one end of said plunger (56) and said cable line (42) is connected at one end to the button element and at another end thereof to the turning lever (52') of the cam disk (52), whereby said cam disk (52) is rotated by means of the cable line (42) in response to a motion of the button element (26).

7. The motor-driven hedge clipper as defined in claim 6, wherein said cam disk (52) is arranged next to one end of said button element (26) and said cable line (42) is connected to said button element (26) near said one end of said button element.

8. The motor-driven hedge clipper as defined in claim 6, wherein said auxiliary handle (22) has a screw dome (32), said button element (26) is rotatable about a rotary point at said screw dome (32), said screw dome (32) acts as an abutment for said button element (26) and said button element (26) is simultaneously supported so as to be linearly displaceable relative to said rotary point.

9. The motor-driven hedge clipper as defined in claim 6, wherein said auxiliary handle (22) has an additional screw dome (32'), said button element (26) is freely movable within predetermined limits in a central plane thereof relative to an additional rotary point provided at said additional screw dome (32') and said additional screw dome (32') acts as an additional abutment for said button element (26).

\* \* \* \* \*